United States Patent
Dangott

(10) Patent No.: US 8,941,584 B2
(45) Date of Patent: Jan. 27, 2015

(54) APPARATUS, SYSTEM, AND METHOD FOR SIMULATING PHYSICAL MOVEMENT OF A DIGITAL IMAGE

(76) Inventor: Bryan Dangott, Salt Lake City, UT (US)

( * ) Notice: Subject to any disclaimer, the term of this patent is extended or adjusted under 35 U.S.C. 154(b) by 998 days.

(21) Appl. No.: 12/892,677

(22) Filed: Sep. 28, 2010

(65) Prior Publication Data

US 2011/0074682 A1    Mar. 31, 2011

Related U.S. Application Data

(60) Provisional application No. 61/246,512, filed on Sep. 28, 2009, provisional application No. 61/319,154, filed on Mar. 30, 2010, provisional application No. 61/320,999, filed on Apr. 5, 2010, provisional application No. 61/355,991, filed on Jun. 17, 2010, provisional application No. 61/356,011, filed on Jun. 17, 2010.

(51) Int. Cl.
| | |
|---|---|
| G09G 5/00 | (2006.01) |
| G06K 9/64 | (2006.01) |
| G06F 3/038 | (2013.01) |
| G06F 3/0354 | (2013.01) |

(52) U.S. Cl.
CPC .............. *G06F 3/038* (2013.01); *G06F 3/0354* (2013.01); *G06F 3/03548* (2013.01)
USPC ............................ 345/156; 382/278; 382/298

(58) Field of Classification Search
CPC ...................................................... G02B 21/00
USPC .................................................. 345/156–169
See application file for complete search history.

(56) References Cited

U.S. PATENT DOCUMENTS

| | | | |
|---|---|---|---|
| 5,602,674 A | 2/1997 | Weissman et al. | |
| 5,790,308 A | 8/1998 | Kamentsky | |
| 5,900,708 A | 5/1999 | Den Engelse et al. | |
| 6,522,774 B1 * | 2/2003 | Bacus et al. | 382/133 |
| 7,500,794 B1 * | 3/2009 | Clark | 396/427 |
| 7,627,153 B2 * | 12/2009 | Perz et al. | 382/128 |
| 7,932,504 B2 * | 4/2011 | Yamada | 250/461.2 |
| 8,442,300 B2 * | 5/2013 | Tsuneta et al. | 382/145 |
| 2005/0254696 A1 | 11/2005 | Bacus et al. | |
| 2006/0034543 A1 | 2/2006 | Bacus et al. | |

(Continued)

FOREIGN PATENT DOCUMENTS

WO    2008005868 A2    1/2008

OTHER PUBLICATIONS

"iSlide Input Device", BioImagene innovative digital pathology, http://www.bioimagene.com/products_solutions/input_devices/islide.html, printed from the internet on Mar. 30, 2010.

(Continued)

*Primary Examiner* — Duc Dinh
(74) *Attorney, Agent, or Firm* — Goucher Patent Law; Tyler Goucher

(57) ABSTRACT

An apparatus, system, and method are disclosed for simulating physical movement of a digital image. The apparatus includes an input receiving module, a calculation module, and a output module. The input receiving module is configured to receive a position input identifying a physical unit of measure. The calculation module is configured to correlate the physical unit of measurement to a position of a image positioning coordinate. The output module is configured to output the position of the image positioning coordinate.

22 Claims, 11 Drawing Sheets

(56) References Cited

U.S. PATENT DOCUMENTS

| | | | |
|---|---|---|---|
| 2006/0045388 A1* | 3/2006 | Zeineh et al. | 382/312 |
| 2006/0159367 A1 | 7/2006 | Zeineh et al. | |
| 2007/0008341 A1 | 1/2007 | Endo et al. | |
| 2008/0020128 A1 | 1/2008 | van Ryper et al. | |
| 2008/0107306 A1* | 5/2008 | Matsuzawa | 382/106 |
| 2008/0183071 A1 | 7/2008 | Strommer et al. | |
| 2008/0228422 A1 | 9/2008 | Satoh | |
| 2008/0292159 A1 | 11/2008 | Soenksen et al. | |
| 2008/0304722 A1 | 12/2008 | Soenksen | |
| 2009/0019916 A1 | 1/2009 | Ersue | |
| 2009/0046192 A1 | 2/2009 | Molnar et al. | |
| 2009/0087051 A1 | 4/2009 | Soenksen et al. | |

OTHER PUBLICATIONS

"islide", bioImagene iSlide for Digital Pathology, http://www.ideinc.com/islideCS.html, printed from the Internet on Mar. 30, 2010.

"Leica SCN400—Slide Scanner: Leica Microsystems", Slide Scanner Leica SCN400, http://www.leica-microsystems.com/products/light-microscopes/life-science-research/slide-scanner/details/product/leica-scn400-2/, printed from the Internet on Mar. 29, 2010.

International Search Report, PCT/US2010/050568, Received Jun. 1, 2011.

* cited by examiner

APPARATUS, SYSTEM, AND METHOD FOR SIMULATING PHYSICAL MOVEMENT OF A DIGITAL IMAGE

CROSS-REFERENCES TO RELATED APPLICATIONS

This application claims the benefit of U.S. Provisional Patent Application No. 61/246,512 entitled "Novel Device and Interface for Digital Slide and Computer Navigation" and filed on Sep. 28, 2009 for Bryan Dangott, U.S. Provisional Patent Application No. 61/319,154 entitled "Novel Interface for Navigating x,y Space" and filed on Mar. 30, 2010 for Bryan Dangott, U.S. Provisional Patent Application No. 61/320,999 entitled "Novel Hardware Interface for Correlating Optical Navigation Sensor Signal to Physical Positioning and Digital Slide Movement" and filed on Apr. 5, 2010 for Bryan Dangott, U.S. Provisional Patent Application No. 61/355,991 entitled "Novel Interface for Digital Slide and Computer Navigation" and filed on Jun. 17, 2010 for Bryan Dangott, and U.S. Provisional Patent Application No. 61/356,011 entitled "Novel Interface for Translating Mouse and HID Input Device Movement Via an Interface Bridge" and filed on Jun. 17, 2010 for Bryan Dangott, which are incorporated herein by reference.

FIELD

This subject matter relates to computer navigation and more particularly relates to simulating physical movement of a digital image.

BACKGROUND

Traditional mouse navigation uses (x,y) pixel coordinates of a computer display with the left, top corner pixel defining the minimum value 0,0. The maximum values with traditional mouse based navigation are determined by the pixel at the right, bottom corner of the monitor or display. A state of the art 30-inch monitor can display a pixel resolution of 2560× 1600 pixels. The maximum x and y pixel values for said monitor are therefore 2559 and 1599 since 0 identifies the first pixel in each plane. Therefore, mouse based navigation has an upper limit which is determined by the resolution of the computer display in pixels. Further, in traditional mouse based navigation pixel coordinates are not correlated to any specific unit of measurement. This distorts the navigation when the digital image is magnified.

SUMMARY

From the foregoing discussion, it should be apparent that a need exists for an apparatus, system, and method for simulate physical movement of a digital image. Beneficially, such an apparatus, system, and method would correlate a physical unit of measurement on a physical specimen to position of a displayed portion of the digital image.

The present subject matter has been developed in response to the present state of the art, and in particular, in response to the problems and needs in the art that have not yet been fully solved by currently available digital image navigation systems. Accordingly, the present subject matter has been developed to provide an apparatus, system, and method for simulating physical movement of a digital image that overcome many or all of the above-discussed shortcomings in the art.

The apparatus to simulate physical movement of a digital image is provided with a plurality of modules configured to functionally execute the necessary steps for simulating physical movement of a digital image. These modules in the described embodiments include an input receiving module, a calculation module, and an output module.

The input receiving module, in one embodiment, is configured to receive a position input identifying a physical unit of measure. The calculation module is configured to correlate the physical unit of measurement to a position of an image positioning coordinate. The output module is configured to output the position of the image positioning coordinate.

The apparatus, in one embodiment, also includes a position input unit configured to send the position input to the receiving module in response to a physical movement of the position input unit. In certain embodiments, the position input unit is simultaneously and independently movable along an x-axis and a y-axis. Physical movement of the position input unit substantially replicates movement of a physical slide when viewed under a microscope. In a further embodiment, movement of the position input moves the image positioning coordinate within a boundary corresponding to a dimension of the physical slide without re-centering the input unit. The unit is designed so that all portions of the slide may be viewed with one continuous movement at any magnification without having to retrace physical ground.

In certain embodiments the image positioning coordinate is used determine a portion of a digital image to display. The position input unit, in a further embodiment, is configured to send a second position input to the input receiving module in response to a physical movement of the position input unit. In such an embodiment the calculation module is configured to correlate the physical movement of the position input unit to a second position of the image positioning coordinate. The output module outputs the second position of the image positioning coordinate. In one embodiment the second position of the image positioning coordinate is referenced to move the portion of the digital image to be displayed. Movement of the portion of the digital image displayed substantially replicates movement of a physical slide on a microscope.

The position input unit is further configured, in one embodiment, to send the position input to the input receiving module as a tally of position input unit offsets from an original position of the position input unit.

In a further embodiment, the apparatus may include a bridging module coupled to the position input unit. In such an embodiment, the input receiving module, the calculation module, and the output module may reside within the bridging module such that output of the position of the image positioning coordinate is separated from traditional pointer input navigation of a computer.

In one embodiment, the position input unit includes at least two position sensors configured to sense a rotational position of the position input unit. In yet another embodiment, the output module outputs the position of the image positioning coordinate as a physical position on a physical slide.

The apparatus, in certain embodiments, includes a virtual input module configured to simulate a grid of virtual computer displays to extend a physical boundary of a physical computer display to a virtual boundary. In one embodiment, the virtual boundary is the boundary of the grid of virtual computer displays. In such an embodiment, a digital image of a physical specimen may be mapped to an array of virtual pixel positions on the grid of virtual computer displays. Each virtual pixel position is correlated to a physical unit of measurement on the physical specimen.

In a further embodiment, the position input includes a virtual x-coordinate and a virtual y-coordinate identifying a position in the array of virtual pixel positions. The virtual x-coordinate is equal to a display x-coordinate plus an x display offset multiplied by a display resolution width. The virtual y-coordinate is equal to a display y-coordinate plus a y display offset multiplied by a display resolution height. In a further embodiment, the apparatus includes a display unit having resolution that is less than a resolution of the simulated grid of virtual computer displays.

In one embodiment, the calculation module correlates a width of a virtual pixel position with a physical unit of measurement on a physical specimen by dividing a width of the physical specimen by a total number of virtual pixel positions in an x-axis to obtain a width correlation. Similarly, in certain embodiments, the calculation module correlates a height of a virtual pixel position with a physical unit of measurement on the physical specimen by dividing the height of the physical specimen by a total number of virtual pixel positions in the y-axis to obtain a height correlation. In certain embodiments, the width of the virtual pixel position corresponds to about 0.01 mm or less on the physical specimen and wherein a height of the virtual pixel position corresponds to about 0.01 mm or less on the on the physical specimen.

The apparatus, in a further embodiment, includes a comparison module configured to compare a value for the width correlation with a value for the height correlation to determine which value is greater. In such an embodiment, the correlation module uses the greater value for the width correlation and the height correlation in correlating the position of the virtual pixel in the virtual image with the physical position on the physical specimen.

A system of the present subject matter is also presented to simulate physical movement of a digital image. The system may include a position input module, an input receiving module, a calculation module, and an output module.

The position input unit, in one embodiment, is configured to send a position input identifying a physical unit of measure to the input receiving module in response to a physical movement of the position input unit. The input receiving module is configured to receive the position input identifying a physical unit of measure. The calculation module, in one embodiment, is configured to correlate the physical unit of measurement to a position of an image positioning coordinate. The output module is configured to output the position of the image positioning coordinate.

In one embodiment, the position input unit is simultaneously and independently movable along an x-axis and a y-axis. In such an embodiment physical movement of the position input unit substantially replicates movement of a physical slide when viewed under a microscope.

The position input unit, in a further embodiment, is configured to send the position input to the input receiving module as a tally of position input unit offsets from an original position of the position input unit.

In another embodiment, the position input unit includes a virtual input module configured to simulate a grid of virtual computer displays to extend a physical boundary of a physical computer display to a virtual boundary. In such an embodiment, the virtual boundary comprising the boundary of the grid of virtual computer displays. A digital image of a physical specimen is mapped to an array of virtual pixel positions on the grid of virtual computer displays. Each virtual pixel position is correlated to a physical unit of measurement on the physical specimen.

The calculation module, in one embodiment, correlates a width of a virtual pixel position with a physical unit of measurement on a physical specimen by dividing a width of the physical specimen by a total number of virtual pixel positions in an x-axis to obtain a width correlation. Similarly, in certain embodiments, the calculation module correlates a height of a virtual pixel position with a physical unit of measurement on the physical specimen by dividing the height of the physical specimen by a total number of virtual pixel positions in the y-axis to obtain a height correlation.

A method of the present subject matter is also presented for simulating physical movement of a digital image. The method in the disclosed embodiments substantially includes the steps necessary to carry out the functions presented above with respect to the operation of the described apparatus and system.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the described features, advantages, and characteristics of the subject matter may be combined in any suitable manner in one or more embodiments. One skilled in the relevant art will recognize that the subject matter may be practiced without one or more of the specific features or advantages of a particular embodiment. In other instances, additional features and advantages may be recognized in certain embodiments that may not be present in all embodiments of the subject matter.

These features and advantages of the present subject matter will become more fully apparent from the following description and appended claims, or may be learned by the practice of the subject matter as set forth hereinafter.

BRIEF DESCRIPTION OF THE DRAWINGS

In order that the advantages of the subject matter will be readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the accompanying drawings, in which.

DETAILED DESCRIPTION

Figure 1:
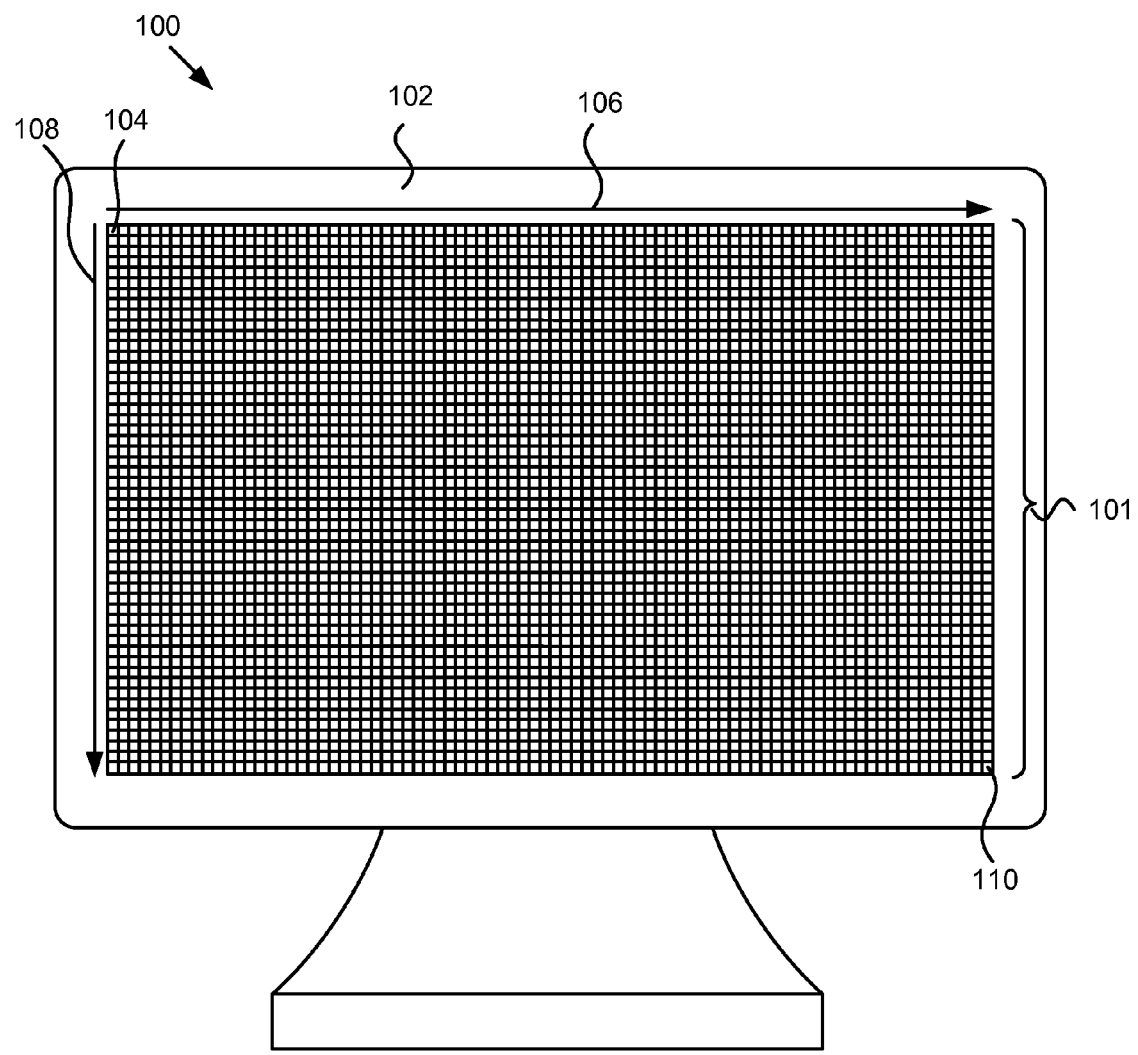
FIG. 1 is a schematic block diagram illustrating one embodiment of a traditional mouse based navigation system 100.

As will be appreciated by one skilled in the art, aspects of the present subject matter may be embodied as a system, method or computer program product. Accordingly, aspects of the present subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present subject matter may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable mediums.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

Furthermore, the described features, structures, or characteristics of the subject matter may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the subject matter.

Aspects of the present subject matter are described below with reference to schematic flowchart diagrams and/or schematic block diagrams of methods, apparatuses, systems, and computer program products according to embodiments of the subject matter. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present subject matter. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

FIG. 1 depicts one embodiment of a traditional mouse based navigation system 100. Traditional mouse based navigation systems 100 use (x,y) pixel coordinates 101 of a computer display 102 to navigate the computer display 102. The pixel coordinates 100 are defined along an x-axis 106 and a y-axis 108. In such a system 100, the pixel 104 positioned at the top left position on the computer display 102 is defined as the minimum value for the x-axis 106 and the y-axis 108. The coordinate of this pixel 104, as defined in the x,y space, is 0,0.

According to traditional mouse based navigation systems 100, the maximum x,y values for a pixel are determined by the pixel 110 at the bottom, rightmost corner of the computer display 102. As discussed above, the first position of a pixel in the x-axis and the y-axis is identified with a "0". A state of the art 30-inch monitor has a pixel resolution of 2560×1600 pixels. Therefore, the x and y values for pixel 110, the pixel located at the bottom, rightmost corner, when viewed on a state of the art 30-inch monitor having a pixel resolution of 2560×1600 pixels, are 2559 and 1599 respectively.

In traditional mouse based navigation systems 100, image resolution, that is, the amount of physical space a pixel represents, is limited by monitor resolution and size. Many monitors with much lower pixel resolutions are currently in use (e.g, 1280×1024). It should be noted that a computer monitor is not necessarily the same as a computer display because a single computer display may include more than one monitor (i.e., a multi-monitor configuration).

Figure 2:
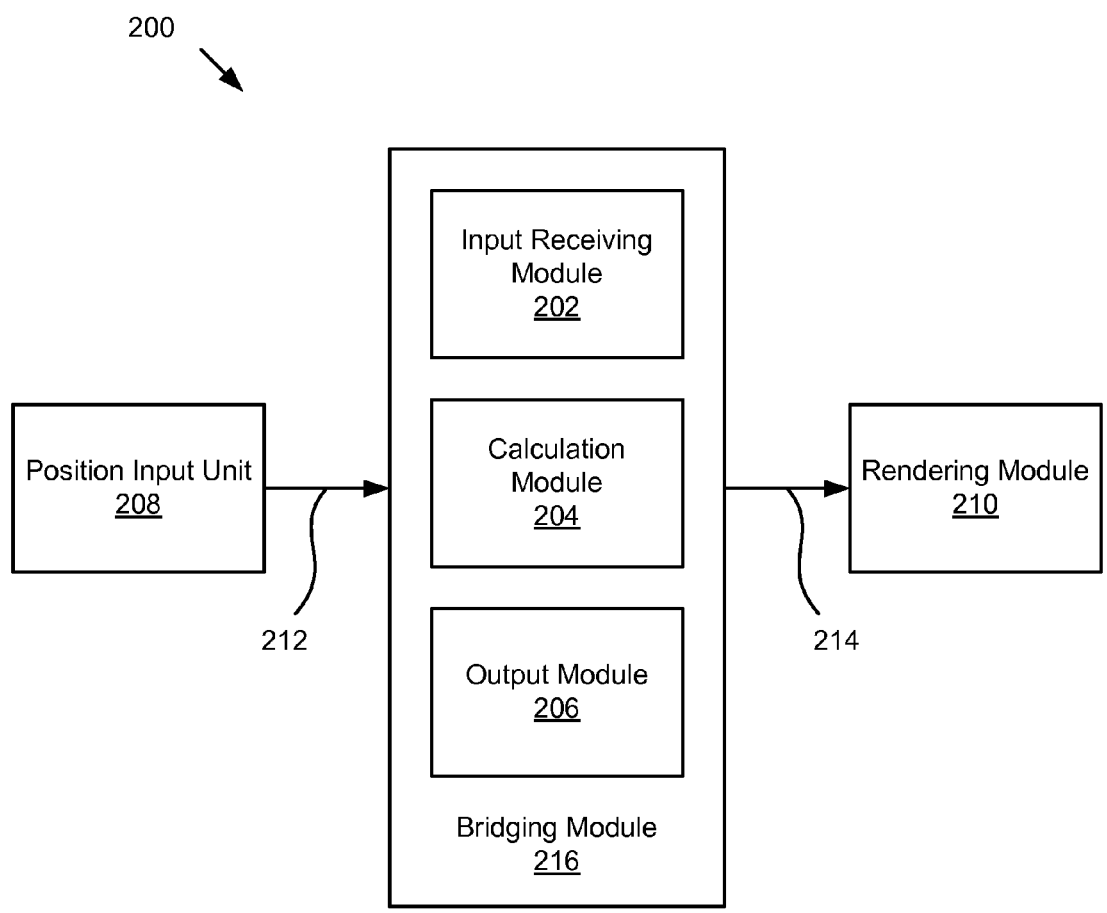
FIG. 2 is a schematic block diagram illustrating one embodiment of an apparatus to simulate physical movement on a digital slide.

FIG. 2 depicts one embodiment of an apparatus 200 for simulating physical movement of a digital image. In certain embodiments, the apparatus 200 includes an input receiving module 202, a calculation module 204, and an output module 206.

In one embodiment, the input receiving module 202 is configured to receive a position input 212 identifying a physical unit of measure on a physical specimen. In certain embodiments the apparatus 200 may be used to simulate physical movement of a physical slide on a digital display. In such an embodiment the input receiving module 202 receives a position input 212 identifying a physical position on the physical slide. In one embodiment the physical position is identified as a distance away (in cm, mm, μm, etc.) from a point of origin on the physical slide.

Figure 3:
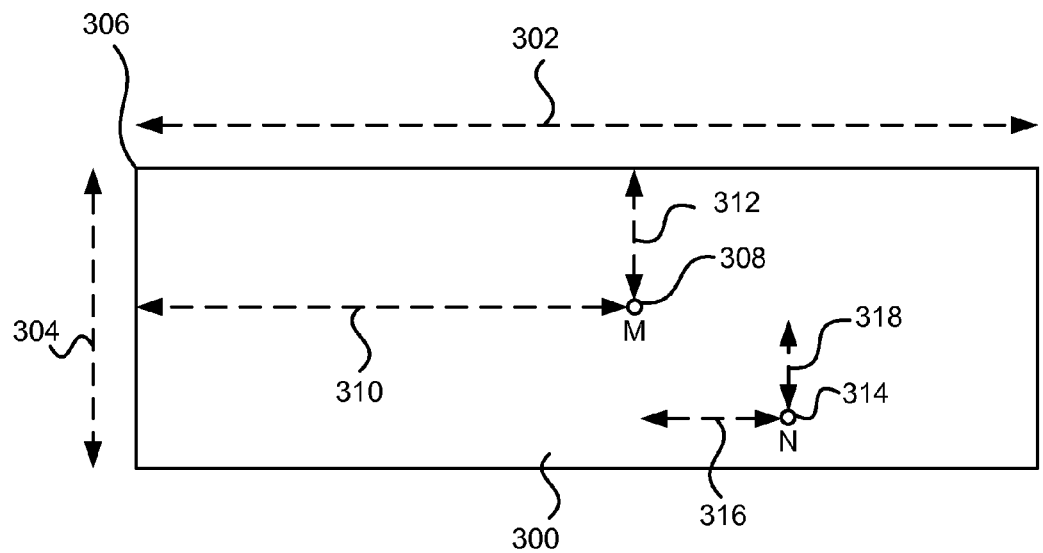
FIG. 3 is a schematic block diagram illustrating one embodiment of a physical slide.

For example, with reference to FIG. 3, a physical slide 300 has a physical x-axis 302 and a physical y-axis 304. If the top leftmost position on the physical slide 300 is defined as the point of origin 306, a position on the physical slide 300, say position "M" 308, may be identified by determining a physical x-coordinate and a physical y-coordinate. The physical x-coordinate is equal to a distance 310 of position M 308 from the point of origin 306 along the physical x-axis 302. Similarly, the physical y-coordinate is equal to a distance 312 of position M 308 from the point of origin 308 along the physical y-axis 304. The distances 310, 312 may be identified in centimeters, millimeters, micrometers, or any other physical unit of measurement and may be sent to the input receiving module 202 position input. In certain embodiments only one of the distances 310, 312 may be sent to the input receiving module 202 as the position input. While the embodiment illustrated in FIG. 3 depicts the point of origin 306 as being in the top leftmost position, one of skill in the art will recognize that the distances 310, 312 may be determined from any other origination point on the physical slide 300.

In certain embodiments, the position input 212 may be a physical unit of measurement relative to a prior position input 212. For example, in one embodiment, the of a second position, say position "N" 314, may use position M 308 as the point of origin. In such an embodiment, the position input 212 would be a physical unit of measurement identifying a distance 316 between the position of position M 308 and the position of position N 314 on the x-axis 302 and a distance 318 between the position of position M 308 and the position of position N 314 on the y-axis 304.

Referring again to FIG. 2, in one embodiment the calculation module 204 of the apparatus 200 correlates the physical unit of measurement received by the input receiving module 202 to a position of an image positioning coordinate 214. In certain embodiments the physical unit of measurement is correlated to the position of the image positioning coordinate 214 by dividing the physical dimensions of the physical slide 300 by the number of possible positions of the image positioning coordinate 214 in a digital image of the physical slide 300.

Figure 4:
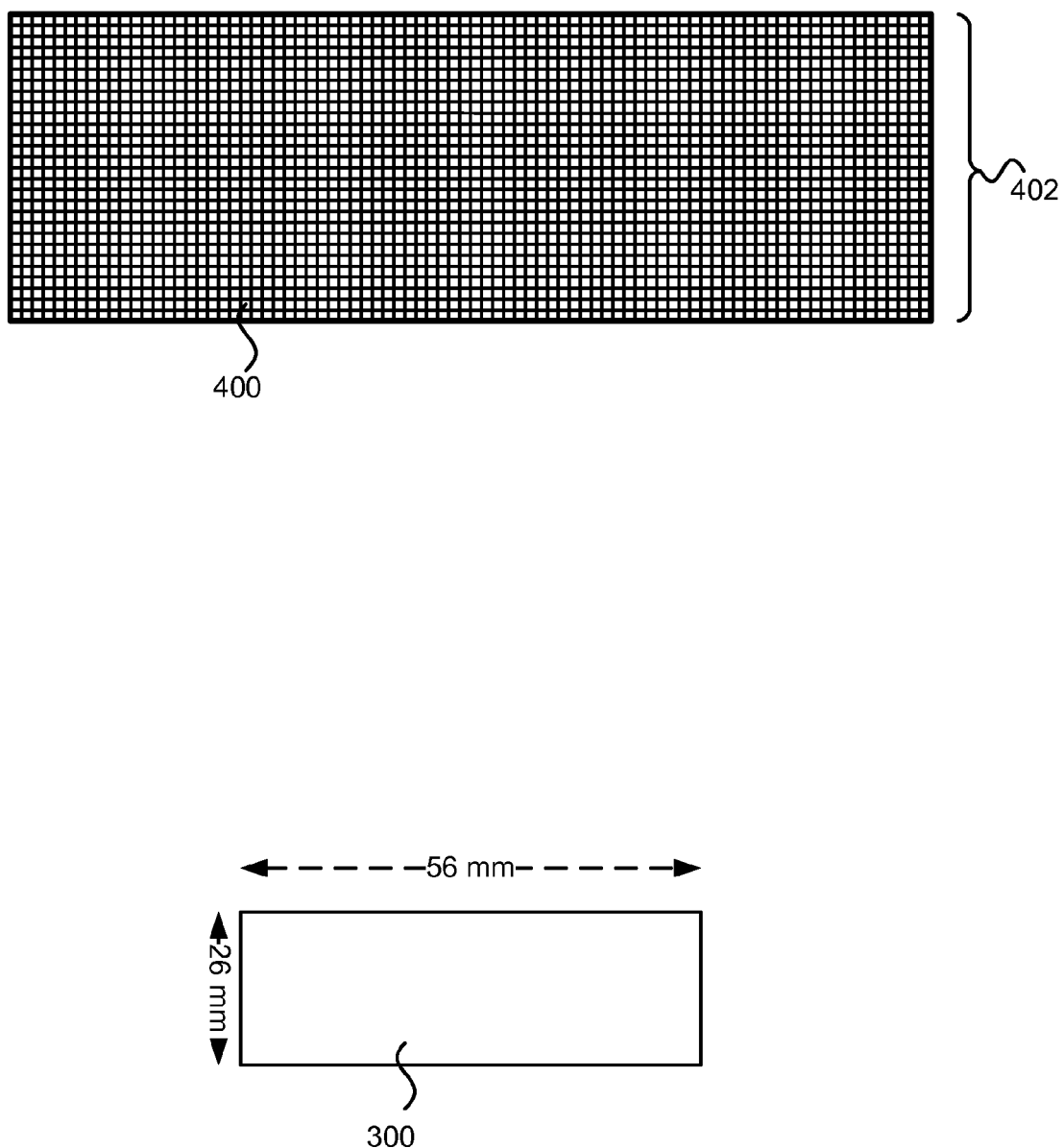
FIG. 4 is a schematic block diagram illustrating one embodiment of a physical slide and a digital image representing the physical slide.

For example, referring to FIG. 4, one of skill in the art will recognize that in high-resolution digital microscopy a viewable area of a physical slide 300 is 56 mm×26 mm. This 56 mm×26 mm viewable area of the physical slide 200 is scanned digitally to create a digital image 400. The digital image 400 includes a plurality of possible positions 402 for the image positioning coordinate 214. Each possible position 402 of the image positioning coordinate 214 includes a digital image x-coordinate and a digital image y-coordinate. In certain embodiments, the total number of possible positions on the x-axis of the digital image 400 is 5119 and the total number of possible positions on the y-axis of the digital image 400 is 3199 (roughly the pixel resolution of a grid of four state of the art monitors). In such an embodiment, the calculation module 204 correlates the physical unit of measurement of the physical slide along the x-axis of the digital image 400 by dividing the width (56 mm) of the digital slide 300 by the total number of possible positions (5119) on the x-axis of the digital image 400. Thus, each pixel in the x-axis represents about 0.011 mm on the physical slide 300. Similarly, the calculation module 204 correlates the physical unit of measurement of the physical slide along the y-axis of the digital image 400 by dividing the height (26 mm) of the digital slide 300 by the total number of possible positions (3199) on the y-axis of the digital image 400. Accordingly, each pixel in the y-axis represents about 0.008 mm on the physical slide 300. When using these physical measurement conversions the larger of the two values for the digital x and y correlation should be used to provide equivalent movement in the x and y-plane for each pixel. This allows for a more linear correlation of movement between an input unit and image movement on a display.

While the embodiment discussed above uses 5119 as the total number of possible positions on the x-axis and 3199 as the total number of possible positions on the y-axis, one of skill in the art will recognize that in other embodiments other values may be used for the total number of possible position in the x-axis and y-axis.

In traditional image navigation, a navigational input device such as a mouse, trackball, etc., uses screen dimensions to track an x,y coordinate of a cursor on a computer display. Traditional mice report movement as an offset from the previous position which is then translated to cursor movement on the screen. Most programs use cursor position on the screen for interaction with the mouse. Thus, movement of a digital image is limited by the dimensions of a computer display. By correlating the position input 212 with a physical unit of measurement on the physical slide 300, the apparatus 200 of the present disclosure extends the dimensions of navigable area to the dimensions of the digital image 400.

In certain embodiments the digital image 400 may have as many as 215,000×105,000 pixels or more. Because state of the art monitors can only display 2560×1600 pixels at a time, only a small portion of the digital image can be displayed on a monitor at a given time when viewed under high magnification. Therefore, a significant amount of panning needs to be done to view the whole image at high magnification. Panning has typically been accomplished using a mouse to "click and drag" the image across the computer display. A click and drag interface is not practical in a diagnostic setting as physicians have been trained to developed fine motor skills using a physical slide and microscope.

As discussed above, the physical dimensions of a viewing area on a physical slide are generally 56 mm×26 mm or less. Thus, a digital image of the viewable area of the physical slide represents 56 mm×26 mm or less. For ideal navigation purposes, the physical dimensions should be used to navigate the digital image rather than pixel positions within the digital image. This is because the pixels available for traditional mouse based navigation will vary depending on magnification of the viewable area and monitor configuration (i.e., multiple monitors).

The calculation module 204 of apparatus 200 removes the variables of the number of available pixels and the monitor configuration by correlating a physical unit of measurement on the physical slide with a image positioning coordinate 214. By converting an image positioning coordinate 214 to a unit of measurement (cm, mm, μm, etc.) the correlation between movement of a position input unit 208 and movement of the digital image on a display unit can be maintained under various magnification settings of the digital image. This has significant implications in high-resolution digital microscopy because the amount of movement that is observed under various magnifications is correlated to the amount of movement of the position input unit 208.

Referring again to FIG. 2, in certain embodiments, the output module 206 outputs the position of the image positioning coordinate 214 for use by a rendering module 210. In one embodiment, the rendering software module 210 the position of the image positioning coordinate 214 to determine which portion of digital image 400 to display in a display unit (not shown). One of skill in the art will recognize that in certain embodiments, the output module 206 may output the image positioning coordinate 214 as a coordinate of a pixel in the digital image 400. In other embodiments, output module 206 may output the image positioning coordinate 214 as a physical position on the physical slide 300.

In certain embodiments, the apparatus 200 includes a position input unit 208 configured to send the position input 212 to the input receiving module 202 in response to a physical movement of the position input unit 208. The position input unit 208 may be a mouse, trackball, keyboard, joystick, touchpad, or any other human interface device that receives input from a user. In one embodiment, as discussed below, the position input unit 208 may include a surface that is simultaneously and independently movable along an x-axis and a y-axis to substantially replicate movement of a physical slide when viewed under a microscope.

In one embodiment, the input receiving module 202, the calculation module 204, and the output module 206 reside on a computing device (not shown) and are configured to receive the position input 212 identifying the physical unit of measure, correlate the physical unit of measure to a position of the image positioning coordinate 214 and output the position of the image positioning coordinate 214 to the rendering module 210. In other embodiments, a bridging module 216 is coupled to the position input unit 208. In such an embodiment, the input receiving module 202, the calculation module 204, and the output module 206 may reside within the bridging module 216 such that output of the image positioning coordinate is separated from traditional pointer input navigation of the computing device.

In certain embodiments, the bridging module 216 includes a USB host and a USB microcontroller. The USB host contains software to recognize position input 212 information from the position input unit 208. The microcontroller hosts the input receiving module 202, the calculation module 204, and the output module 206 to process the position input 212 information and deliver the image positioning coordinate 214 to the rendering module 210 via a device driver. In certain embodiments, the bridging module 216 delivers a unique signal representing the image positioning coordinate 214 separate from a signal of a traditional pointer input (i.e., a mouse, trackball, etc.) such that two navigational devices can be connected to the same computer. For example, in one embodiment a first navigation device may be coupled to the computing device through a USB port or other navigational input port. The position input unit 208 may then be coupled to the bridging module 216, which in turn may be coupled to the computing device through another USB port or other navigational input port. The bridging module 216 intercepts the position input 212 from the position input unit 208 and does not affect conventional navigation of the computing device by the first navigational device.

The bridging module 216 is useful in embodiments where two navigational inputs are required, with each navigational input used for different purposes. For example, in digital pathology one navigational input, the position input unit 208, may be used to navigate the digital slide 400 and the other may be used for traditional navigation.

As discussed above, traditional navigational input devices use display dimensions to track the x,y position of a cursor on a computer display. Using the input receiving module 202, the calculation module 204, and the output module 206 to process the position input 212 information and deliver the image positioning coordinate 214 to the rendering module 210, the bridging module 216 extends the dimensions of a computer display to virtual dimensions of the digital image 400 (i.e, to the number of possible positions 402 for the image positioning coordinate 214).

Figure 5:
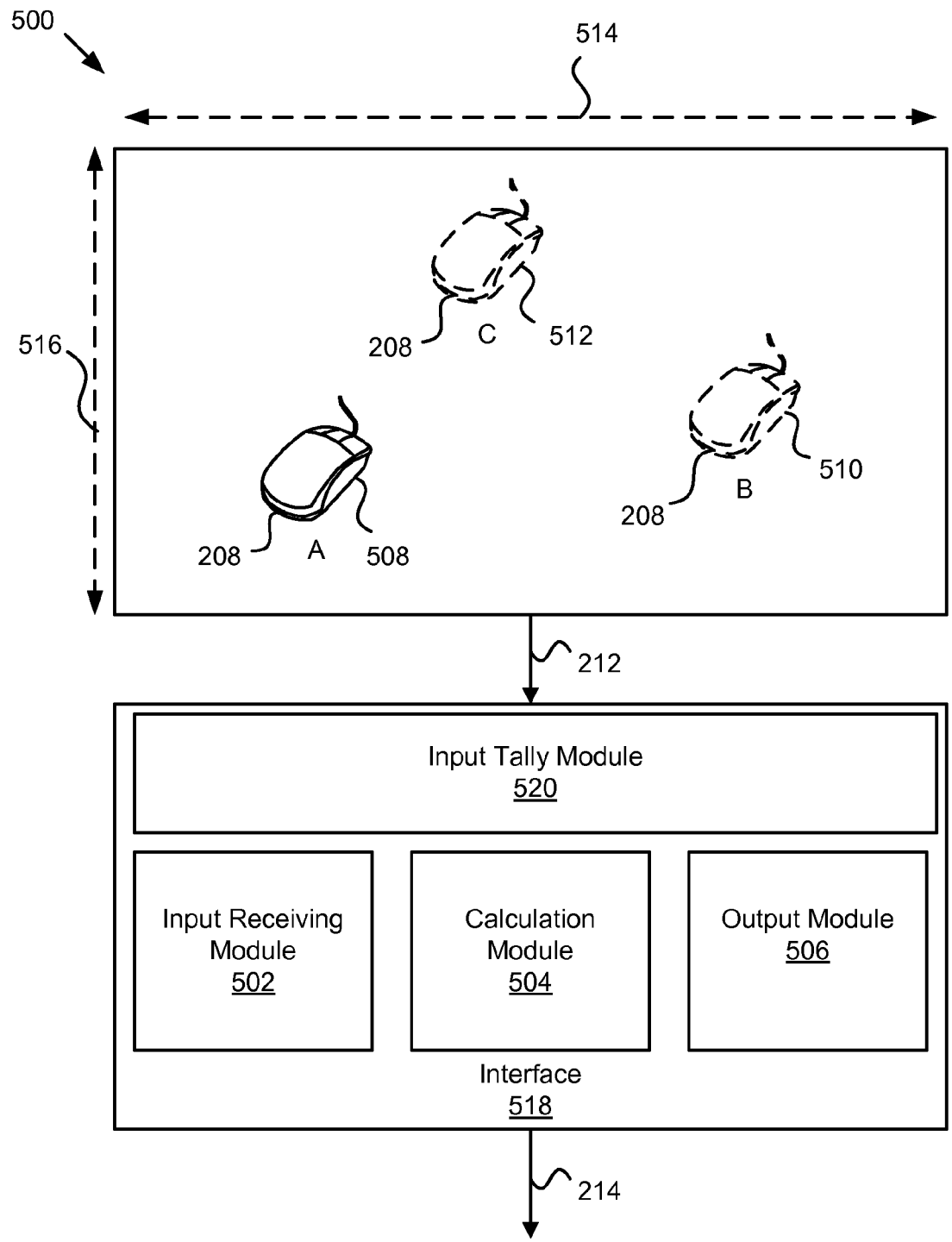
FIG. 5 is a schematic block diagram illustrating another embodiment of an apparatus to simulate physical movement on a digital slide.

FIG. 5 depicts one embodiment of an apparatus 500 for simulating physical movement of a digital image 400. In certain embodiments the apparatus 500 includes an input receiving module 502, a calculation module 504, and an output module 506.

In certain embodiments, the apparatus 500 includes a novel hardware interface that extends the function of a conventional navigational sensor, such as a mouse or other pointing device, used as the position input unit 208. Conventional navigational pointing devices interact with the operating system of a computer to report x,y positions of the pointer on a computer display. This makes the interface between a conventional pointing device and a computer subject to the limitations (i.e., pixel resolution) of the computer display.

Using the interface 518 of apparatus 500 a conventional navigational pointing device may be used as the position input unit 208 to report a position of the image positioning coordinate 214 to a computing device without using a traditional pointing device interface. Thus, the computing device can still use another navigational pointing device to navigate the computer display.

The interface 518 includes a programmable electronic circuit that contains the input receiving module 502, the calculation module 504, and the output module 506. The receiving module 502, the calculation module 504, and the output module 506 operate to receive the position input 212 from the position input unit 208 and correlate it to an image positioning coordinate 214.

The interface 518 may be coupled to the computing device through a USB port, PS2 port, serial port, 1394 port, Bluetooth, wireless, or any other conventional computer connection. The interface 518, in one embodiment, includes a computer interrupt that is distinct from the conventional pointing device used to navigate the computer display. By doing so, a conventional mouse and the interface 518 can operate within the same computing system without conflict or software techniques to isolate the signals of the two devices. In certain embodiments, the interface 518 may configured to avoid interference with a mouse pointer.

In operation, the interface 518 includes an input tally module 518 configured to tally a series of position inputs 212 to determine a physical displacement of the position input unit 208 from the original position. The input receiving module 502 receives the tallied position input 212 from the position input unit 208, which, in the embodiment illustrated in FIG. 5, is a conventional navigational pointing device such as a mouse. The tallied position input 212 identifies a physical displacement of the position input unit 208 from an original position. For example, in the embodiment illustrated in FIG. 5, the position input unit 208 may have an original position "A" 508. If the position input unit 208 is moved to position "B" 510, the input tally module 520 determines the physical distance traveled on an x-axis 514 from the original position A 508 to determine the physical displacement of the position input unit 208 on the x-axis 514 as a physical unit of measurement. Similarly, the input tally module 520 determines the physical distance traveled on a y-axis 516 from the original position A 508 to determine the physical displacement of the position input unit 208 on the y-axis 516 as a physical unit of measurement.

If the position input unit 208 is repositioned to position "C" 512, the input tally module 520 determines the physical distance traveled on the x-axis 514 from the position B 510. The total distance traveled on the x-axis 514 is the sum of the distance traveled on the x-axis 514 between position A 508 and position B 510 and the distance traveled on the x-axis 514 between position B 510 and position C 512. The total distance traveled on the y-axis 516 is the sum of the distance traveled on the y-axis 516 between position A 508 and position B 510 and the distance traveled on the y-axis 516 between position B 510 and position C 512. One of skill in the art will recognize that distance traveled on both the x-axis 514 and the y-axis 516 can have a positive or negative value depending on the direction of travel. Therefore, the input tally module 520 adds or subtracts the position information 212 from the total distance tally.

In certain embodiments, the input tally module 520 uses the resolution of a sensor in the position input unit 208 and a tally of position input unit 208 signals (counts) to correlate a position of the position input unit 208 with a physical movement according to the following equation:

Physical displacement of the position input unit 208=sensor signal tally/((sensor resolution)×(25.4))

Where sensor resolution is given in counts per inch (CPI) and where the physical displacement of the position input unit 208 is given in millimeters.

The calculation module 504 correlates the physical displacement of the position input unit 208 to a position of an image positioning coordinate 214. The output module 506 outputs the position of the image positioning coordinate 214 to a rendering module (not shown) to directly correlate physical movement of the position input unit 208 with a perceived movement of a display image. In comparison, when using an operating system to track conventional mouse movement, the operating system applies ballistics which may change the 1:1 ratio of position input unit 208 movement to movement of the image positioning coordinate 214.

In certain embodiments, if the amount of physical distance to be traveled to view an entire digital image 400 is known, the tally input module 520 can be tuned to maximum and minimum values (a target range). This prevents the tally from growing beyond what is needed for the target range. By limiting the tally to a target range, a user does not need to repeatedly drag and click the position input unit 208 to get the tally back within the target range. For example, in digital microscopy where a user typically navigates a digital image 400 of a physical slide having a viewable area of 56 mm×26 mm, the target range is 0 to 57 mm on the x-axis and 0 to 26 mm on the y-axis. One of skill in the art will recognize that a smaller target range increases the responsiveness of the apparatus 500.

In one embodiment, the input tally module 520 may be located on the on the position input unit 208 and the signals from the position input may be tallied prior to processing by the input receiving module 504, the calculation module 504, and the output module 506. This moves the processing of the signal from the position input unit 208 off of the pixel grid and onto a hardware encoder on the position input unit 208. In such an embodiment movement of the position input unit 208 in x,y space is captured with respect to the previous position by returning a negative number, 0, or a positive number for each of the x-axis 514 and the y-axis 516. The input tally module 520 maintains a tally of input positions to determine the actual offset from the original position A 508 of the position input unit 208.

The tally of inputs maintained by the tally input module 520 are correlated to the possible positions 402 of the image positioning coordinate 214 on the digital image 400 by the calculation module 504. Using the 57 mm length above, a total of 5700 possible positions 402 of the image positioning coordinate 214 would be needed to obtain a resolution of 0.01 mm per possible positions 402 of the image positioning coordinate 214.

In certain embodiments, the number of possible positions 402 for a given axis is approximately one hundred times the physical slide dimension for that axis. Such a resolution results in a smooth movement of the digital image 400 on a computer display. A higher number of possible positions 402 results in a resolution of less than 0.01 mm per position 402. A resolution of less than 0.01 mm per position 402 results in smoother and finer movement of the digital image 400 but may slow the responsiveness of the apparatus 500. A resolution of less than 0.01 mm per position 402 also require more movement of the position input unit 208 for the same movement in the digital image 400.

Figure 6:
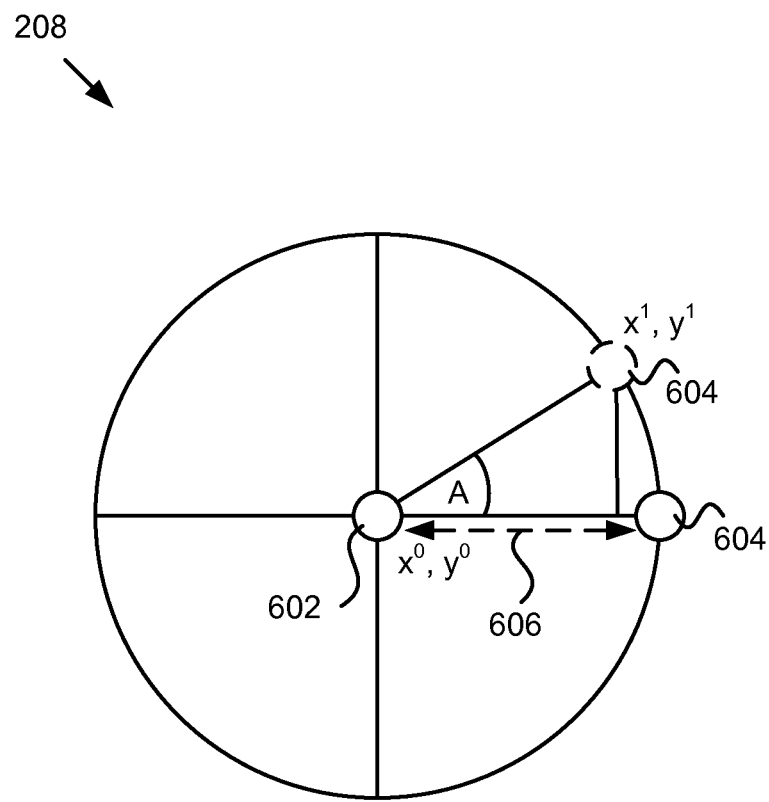
FIG. 6 is a schematic block diagram illustrating one embodiment of a position input unit.

FIG. 6 depicts one embodiment of a position input unit 208 having a first sensor 602 and a second sensor 604. In such an embodiment, the second sensor 604 may be used to track rotation of the position input unit 208 by measuring the relative positions of the two sensors 602, 604 and calculating rotation from an arbitrary starting position. If the distance 606 between the sensors 602, 604 in the x-plane is known, the following formula could be used to determine the rotation of the position input unit 208.

Sine $A = y1 - y0/$(the distance 606 on the x-plane between the sensors 602,604).

This rotational information is provided to the calculation module 502 to correlate the physical rotation of the position input unit 208 to a position of an image positioning coordinate.

In one embodiment, the second sensor 604 is included in the position input unit 208 to enhance the sensitivity of the of the position input unit 208 for tracking the position of the position input unit 208. Averaging algorithms, dual detection algorithms in the event of a miscount of one of the sensors 602, 604, or leading indicator algorithms may be used to enhance the sensitivity of the of the position input unit 208. These algorithms are within the skill of one in the art.

Figure 7:
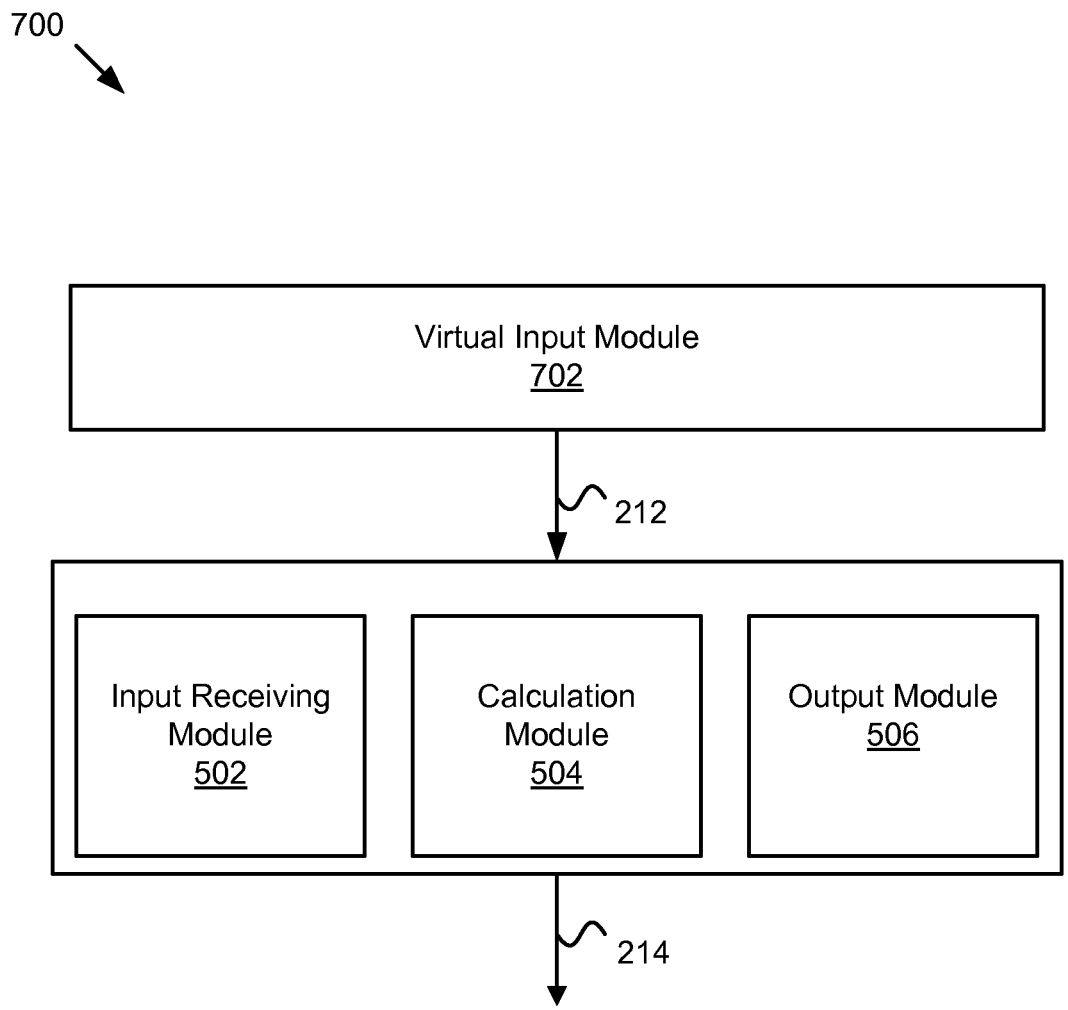
FIG. 7 is a schematic block diagram illustrating another embodiment of an apparatus to simulate physical movement on a digital slide.

FIG. 7 depicts one embodiment of an apparatus to for simulating physical movement of a digital image 400. In certain embodiments the apparatus 700 includes an input receiving module 502, a calculation module 504, and an output module 506 substantially similar to the input receiving module 502, the calculation module 504, and the output module 506 described above with reference to apparatus 500. In one embodiment the apparatus 700 includes a virtual input module 702.

The virtual image module 702, in one embodiment, is configured to simulate a grid of virtual computer displays to extend a physical boundary of a physical computer display to a virtual boundary comprising the boundary of the grid of virtual computer displays. The digital image 400 of a physical specimen, such as a physical slide 300, is mapped to an array of virtual pixel positions on the grid of virtual computer displays. Each virtual pixel position is correlated to a physical unit of measurement on the physical specimen. The position of the image positioning coordinate 214 is one of the virtual pixel positions in the array of virtual pixel positions.

Figure 8:
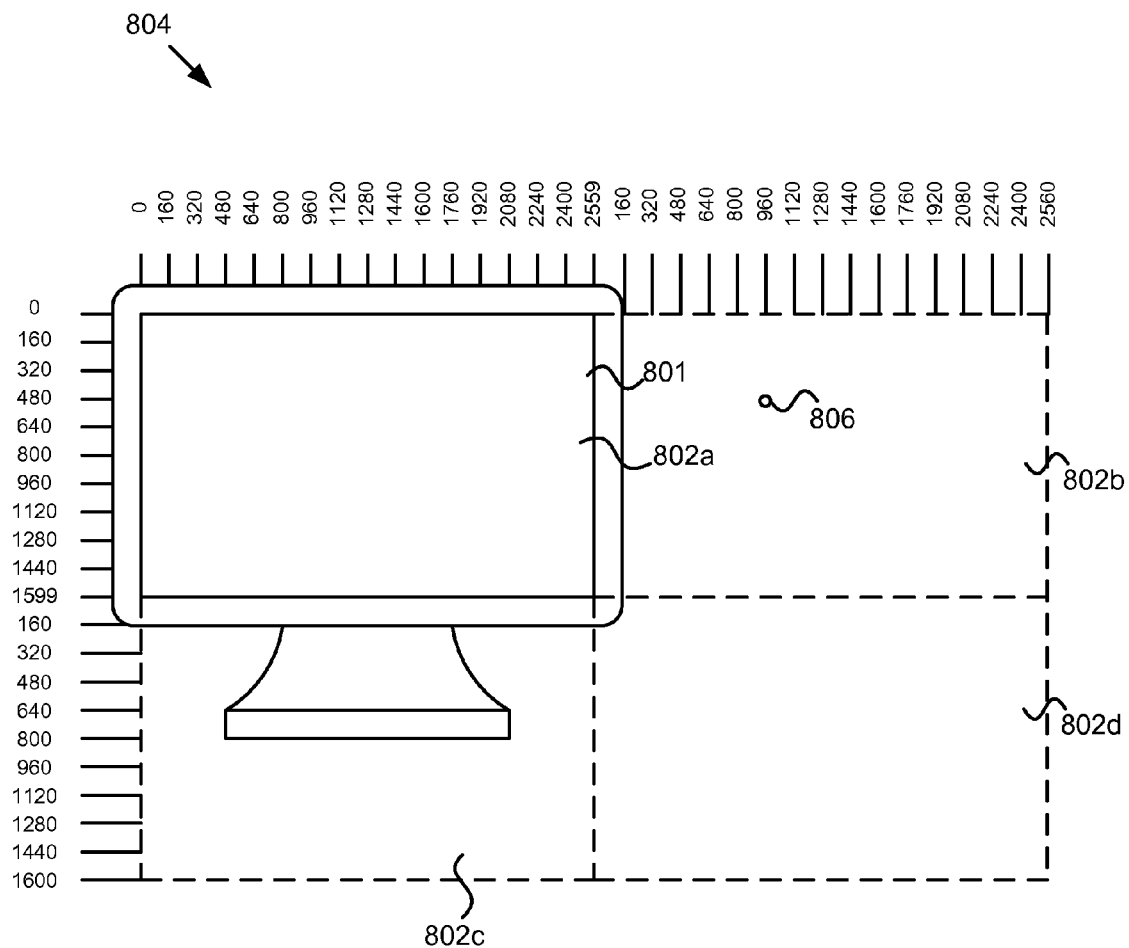
FIG. 8 is a schematic block diagram illustrating one embodiment of a grid of virtual computer displays.

For example, with reference to FIG. 8, as discussed above, a state of the art 30-inch monitor 801 can display a pixel resolution of 2560×1600 pixels. Therefore, the maximum x and y values for such a monitor 801 are 2559 and 1599 since 0 identifies the first pixel in each plane. The virtual image module 702 extends the boundaries of the monitor 801 by using a simulated grid 804 of virtual computer displays 802a-802d.

The positions of the virtual computer displays 802a-802b are mapped to a coordinate in an x and x-plane in much the same way as pixels are mapped to positions on an actual display. Thus, the top left virtual computer display, display 802a, occupies a position in the simulated grid 804 of virtual computer displays 802a-802d with a coordinate of 0,0. The top right virtual computer display, display 802b, is offset in the x-plane by 1 but is not offset in the y-plane. Thus, virtual computer display 802b occupies a position in the simulated grid 804 of virtual computer displays 802a-802d with a coordinate of 1,0. The bottom left virtual computer display, display 802c, is offset in the y-plane by 1 but is not offset in the y-plane. Thus, virtual computer display 802b occupies a position in the simulated grid 804 of virtual computer displays 802a-802d with a coordinate of 0,1. Finally, the bottom right virtual computer display, display 802b, is offset in both the x-plane and the y-plane and occupies a position in the simulated grid 804 of virtual computer displays 802a-802d with a coordinate of 1,1.

While the embodiment illustrated in FIG. 8 only depicts the simulated grid 804 of virtual computer displays 802a-802d as having four virtual computer displays 802a-802d, one of skill in the art will recognize that in other embodiments the simulated grid 804 of virtual computer displays 802a-802d may have additional virtual computer displays. In such an embodiment each additional virtual computer display on the x-axis would have an offset of 1+the x-plane coordinate of the previous virtual computer display on the x-axis and each additional virtual computer display on the y-axis would have an offset of 1+the y-coordinate of the previous virtual computer display on the y-axis.

As discussed above, the digital image 400 comprises an array of pixels, with each pixel mapped to a virtual pixel position on the grid 804 of virtual computer displays 802a-802d. Each virtual pixel position on the grid 804 of virtual computer displays 802a-802d is correlated to a physical unit of measurement on the physical slide 300. In certain embodiments, each virtual pixel position on a particular virtual computer display 802a is defined by a display x-coordinate and a display y-coordinate. The virtual input module 702 tracks both the position of a particular virtual computer display 802 as well as the display x and y-coordinates to send the position input 212 to the input receiving module 502 as a physical unit of measurement.

In one embodiment, the position input 212 comprises a virtual x-coordinate and a virtual y-coordinate identifying a position in an array of virtual pixel positions, the virtual x-coordinate comprising a display x-coordinate plus a x display offset multiplied by a display resolution width, the virtual y-coordinate comprising a display y-coordinate plus a y display offset multiplied by a display resolution width.

For example, the position input 212 for a virtual pixel position 806 having a display coordinate of 960, 480 on virtual computer display 802b would identify a virtual x-coordinate and a virtual y-coordinate of the virtual pixel position 806 within the grid 804 of virtual computer displays 802a-802d in the following manner. The virtual x-coordinate is equal to the display x-coordinate (960) plus an x display offset (the virtual pixel position 806 is located on the top left virtual computer display 802b which has an x display offset of 1) multiplied by a display resolution width (the virtual computer displays 802a-802d have a resolution width of 2559). Accordingly, the virtual x-coordinate is 3519 (960+1*2559=3519). The virtual y-coordinate is equal to the display y-coordinate (480) plus the y display offset (the virtual pixel position 806 is located on the top left virtual computer display 802b which has an y display offset of 0) multiplied by a display resolution height (the virtual computer displays 802a-802d have a resolution height of 1559). Accordingly, the virtual y-coordinate is 480 (960+0*1559=480).

In certain embodiments, the virtual input module 702 includes a switching algorithm that moves the position input 212 to the next virtual pixel position in a neighboring virtual computer display 802a-802d when a screen boundary is encountered. The boundaries occur when either the display x-coordinate or the display y-coordinate equals 0 or the maximum display x-coordinate or maximum display y-coordinate for the given plane. For example, the maximum display x-coordinate occurs at the display width resolution minus 1. When a boundary is encountered the display position is increased by 1 and the display x-coordinate or display y-coordinate is reset to 0. Of note, the switching algorithm may loop between 0 and the maximum display x-coordinate or y-coordinate at the display boundaries. Therefore, it is useful to implement a variable to track the last display x-coordinate or y-coordinate to prevent looping. Other techniques to prevent looping include a vector indicator or offsetting the display x-coordinate or y-coordinate by one more or one less than the virtual display boundary.

Using the virtual input module a conventional mouse based coordinate system can be expanded in the x and y-plane by the number of additional virtual computer displays in a given plane. For example, in the embodiment described above, the virtual input module 702 extends the number of pixel positions available for navigation from 2560×1600 to 5119×1600 using a single monitor and a simulated grid 804 of just four virtual computer displays 802a-802d.

This is useful when one wishes to correlate a pixel position to a predefined unit of measure such as 56 mm in the x-plane. By increasing the number of pixel positions available for navigation, each pixel refers to a smaller increment of measure when a given dimension needs to be traveled. For example, if one wishes to digitally traverse a 56 mm×26 mm digital image 400 of a physical slide 300 in the x-plane each virtual pixel position would represent about 0.011 mm (56/5119) when using 5119 pixels versus about 0.022 mm when using 2560 pixels in a single display. Each virtual pixel position in the y-axis would represent about 0.008 mm using 3199 virtual pixel positions versus about 0.016 mm using 1600 virtual pixel positions.

Of note, the position input may be displayed on the monitor 801 as a mouse pointer. It may be disorienting for someone to observe changes in the position of a mouse pointer. Therefore, in certain embodiments, the mouse pointer may be hidden via a software command.

Figure 9:
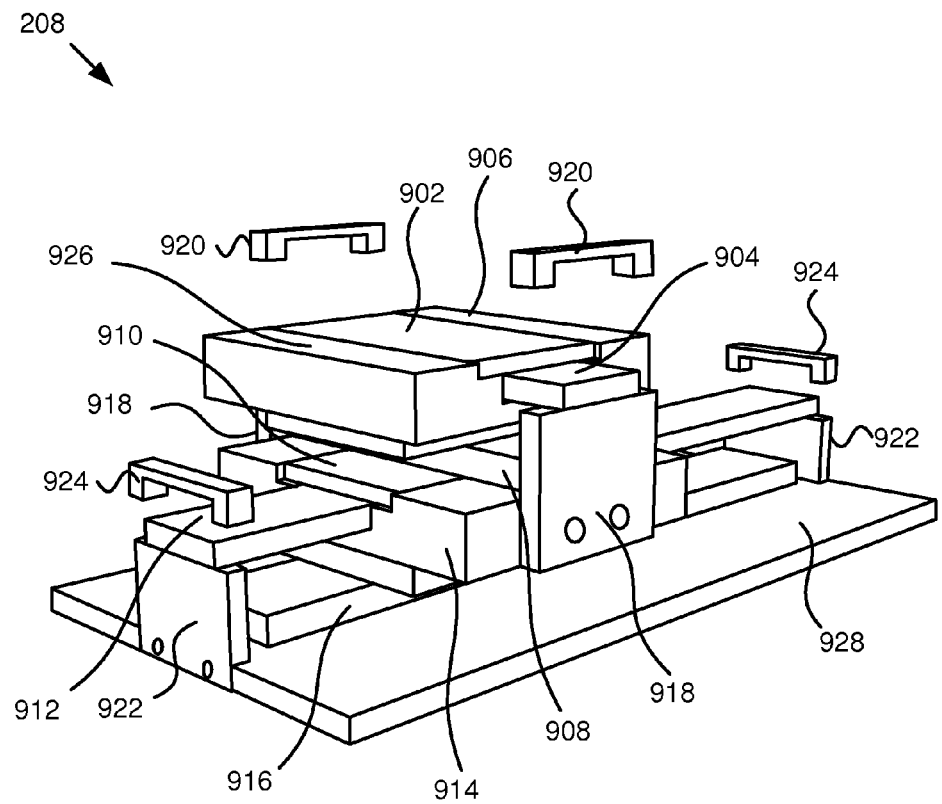
FIG. 9 is a perspective view illustrating one embodiment of a position input unit.

FIG. 9 depicts one embodiment of an input position unit 208 sending a position input 212 to an input receiving module, such as input receiving module 202 discussed above. In certain embodiments, the input position unit 208 includes a y-axis encoder 902, y-axis capacitance tape 904, a y-axis mounting block 906, a y-axis linear ball slide 908, an x-axis encoder 910, an x-axis capacitance tape 912, an x-axis mounting block 914, and an x-axis linear ball slide 916.

In certain embodiments, the position input unit 208 includes two perpendicular linear ball slides, a y-axis linear ball slide 908 and an x-axis linear ball slide 916, that have mounted encoders, a y-axis encoder 902 and an x-axis encoder 910. In certain embodiments, the y-axis encoder 902 and the x-axis encoder 910 include a strip of capacitance tape, the y-axis capacitance tape 904 and x-axis capacitance tape 912 respectively. The y-axis capacitance tape 904 is mounted to a first set of support members 918 by a first pair of rigid bars 920 and the x-axis capacitance tape 912 is mounted to a second set of support members 922 by a second pair of rigid bars 924. The first set of support members 918 and the second set of support members 922 keep the y-axis capacitance tape 904 and x-axis capacitance tape 912 from moving.

The y-axis capacitance tape 904 and x-axis capacitance tape 912 are mounted parallel to the y-axis encoder 902 and the x-axis encoder 910 in the illustrated embodiment. In other embodiments, the y-axis capacitance tape 904 and x-axis capacitance tape 912 may be directly coupled to the y-axis linear ball slide 908 and the x-axis linear ball slide 916 for a more compact design.

In certain embodiments, the y-axis capacitance tape 904 and x-axis capacitance tape 912 remains stationary and the y-axis encoder 902 and x-axis encoder 910 travel along the respective capacitance tape 904 by means of the y-axis linear ball slide 908 and x-axis linear ball slide 916. The y-axis encoder 902 is coupled to the y-axis linear ball slide 908 by means of the y-axis mounting block 906. The x-axis encoder 910 is coupled to the x-axis linear ball slide 916 by means of the x-axis mounting block 914.

In one embodiment, the y-axis mounting block 906 includes a moveable surface 926 that is free to move in both the x-plane and the y-plane. Movement of the moveable surface 926 in the x-plane and the y-plane may be induced both simultaneously and independently. Movement of the moveable surface 926 generates a position input 212 identifying physical x,y coordinates which may be sent from the position input unit 208 to the receiving module 202 for processing by the apparatus 200 as described above.

In certain embodiments the position input unit 208 may be inverted. In such an embodiment, the position input unit support member 928 may be moved while the moveable surface 926 may actually remain substantially stationary. In this case, movement of the position input unit support member 928 generates a position input 212 identifying physical x,y coordinates which may be sent from the position input unit 208 to the receiving module 202 for processing by the apparatus 200 as described above.

Regardless of the orientation of the position input unit 208, the amount of physical movement of the moveable surface 926 or the position input unit support member 928 approximates the physical dimensions of a physical slide 300. In certain embodiments, a physical resistance of the y-axis linear ball slide 908 and the x-axis linear ball slide 916 may be tuned so that the user experience is similar to that of using a physical slide 300 with a standard microscope. In one embodiment, the tuning is accomplished by means of a flexible dust cover (not shown) mounted to y-axis linear ball slide 908 and the x-axis linear ball slide 916. In other embodiments, a brass friction strip, metal spring tension, or screw-tensioning device may be used to adjust the physical resistance of the y-axis linear ball slide 908 and the x-axis linear ball slide 916. One of skill in the art will recognize that the position input unit 208 may include other tuning mechanisms to adjust the physical resistance of the y-axis linear ball slide 908 and the x-axis linear ball slide 916.

In certain embodiments, the position input unit 208 may include an integrated circuit such that the input receiving module 202, the calculation module 204, and the output module 206 may all reside on the position input unit. Physical movement of the position input unit 208 is correlated to a perceived movement of the digital image 400. Therefore, a 0.01 mm movement of the moveable surface 926 or the position input support member 928 in the x-plane will result in a 0.01 mm movement of the digital slide on the x-axis when accounting for digital magnification.

Figure 10:
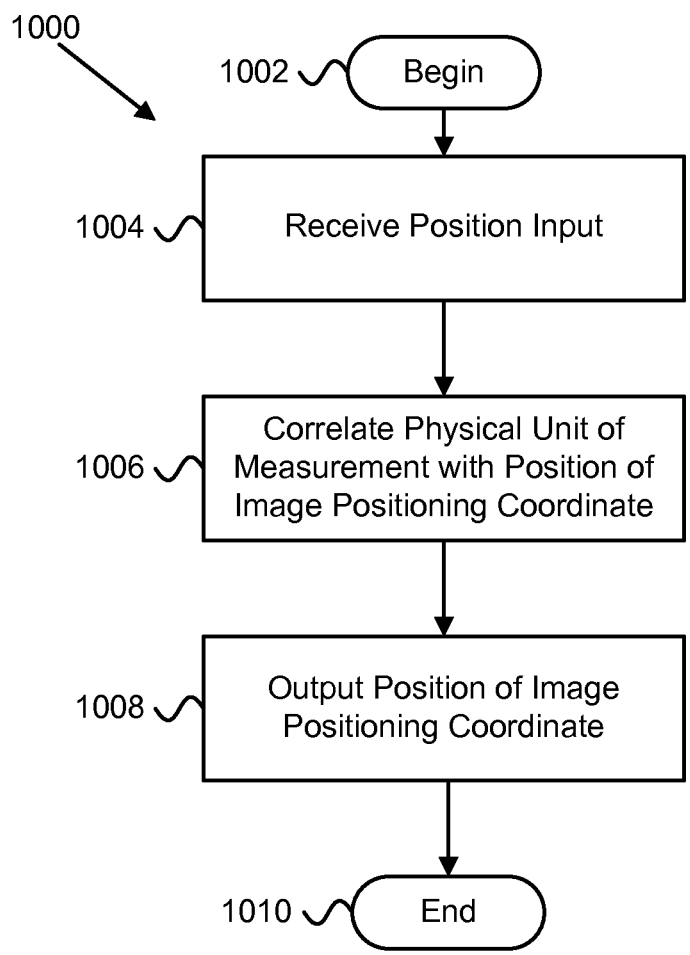
FIG. 10 is a schematic flow chart diagram illustrating one embodiment of a method to simulate physical movement on a digital slide.

FIG. 10 depicts one embodiment of a method 1000 for simulating physical movement of a digital image 400. For the purposes of this discussion the method 1000 is discussed with reference to apparatus 200 described above.

The method begins 1002 and the position input module 202 receives 1004 the position input 212. The position input 212 identifies a physical unit of measure. In certain embodiments the position input may be a coordinate of a physical position on a physical specimen such physical slide 300. In other embodiments, the position input 212 may be a unit of measurement indicating a physical displacement of a position input unit 208. In one embodiment, the position input 212 may be a position of a virtual pixel position on a digital image 400.

A calculation module 204 correlates 1006 the physical unit of measurement received by the input receiving module 202 with an image positioning coordinate. In certain embodiments the image positioning coordinate comprises a coordinate that may be used by a rendering module 210 to determine which portion of a digital image 400 to display in a display unit. An output module 206 outputs 1008 the position of the image positioning coordinate and the method ends 1010.

Figure 11:
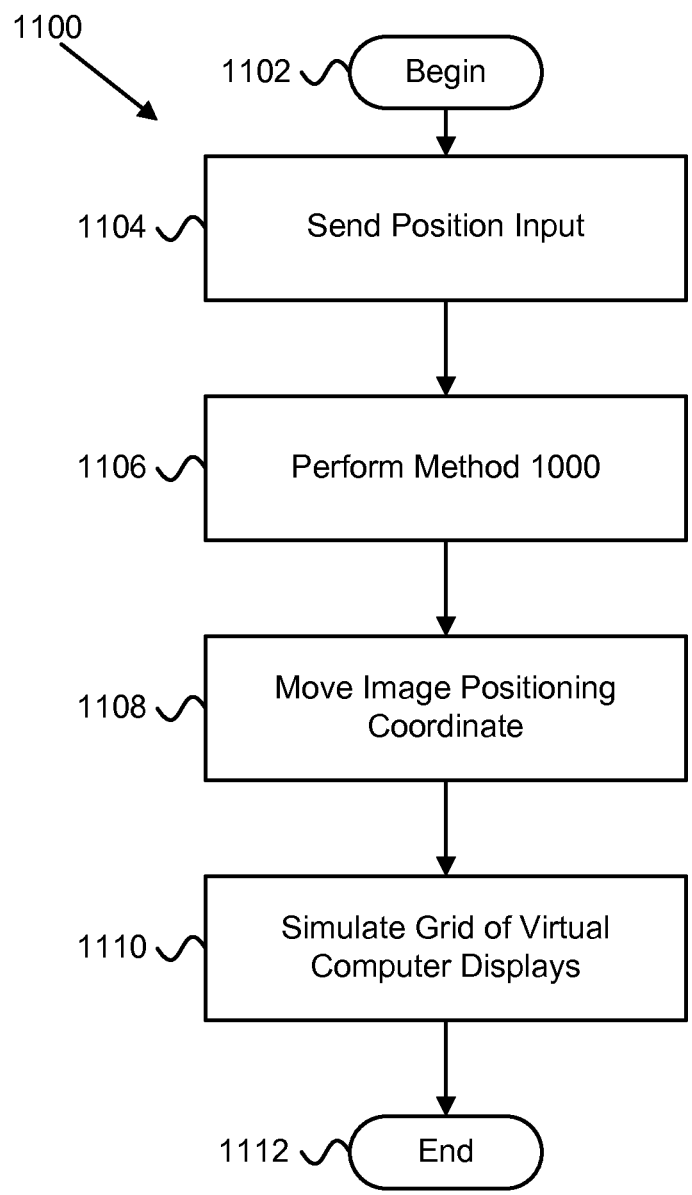
FIG. 11 is a schematic flow chart diagram illustrating another embodiment of a method to simulate physical movement on a digital slide.

FIG. 11 depicts another embodiment of a method 1100 for simulating physical movement of a digital image 400. In certain embodiments the method 1100 begins 1102 and a position input 212 is sent 1104 in response to a physical movement of a position input unit 208. The method 1100 continues and the steps of method 1000 are performed 1106.

In certain embodiments, the image positioning coordinate is moved 1108 a boundary corresponding to the physical dimensions of a physical slide 300.

In one embodiment, a grid of virtual computer displays is simulated 1110 to extend a physical boundary of a physical computer display 801 to a virtual boundary, the virtual boundary comprising the boundary of the grid 804 of virtual computer displays 802a-802d. In such an embodiment, a digital image 400 of a physical specimen, such as a physical slide 300, is mapped to an array of virtual pixel positions on the grid 804 of virtual computer displays 802a-802d. Each virtual pixel position is correlated to a physical unit of measurement on the physical specimen and the method ends 1112.

The present subject matter may be embodied in other specific forms without departing from its spirit or essential characteristics. The described embodiments are to be considered in all respects only as illustrative and not restrictive. The scope of the subject matter is, therefore, indicated by the appended claims rather than by the foregoing description. All changes which come within the meaning and range of equivalency of the claims are to be embraced within their scope.

What is claimed is:

1. An apparatus to simulate physical movement of a digital image, the apparatus comprising:
   an input receiving module configured to receive a position input;
   a calculation module configured to correlate the position input to a position of an image positioning coordinate;
   wherein the calculation module correlates a virtual x-coordinate of a virtual pixel position in a digital image of a physical specimen with a physical x-coordinate on the physical specimen by dividing a width of the physical specimen by a total number of virtual pixel positions in an x-axis to obtain an x-axis correlation; and
   wherein the calculation module correlates a virtual y-coordinate of a virtual pixel position in the digital image of the physical specimen with a physical y-coordinate on the physical specimen by dividing a height of the physical specimen by a total number of virtual pixel positions in a y-axis to obtain a y-axis correlation;
   a comparison module configured to compare a value for the virtual x-coordinate correlation with a value for the virtual y-coordinate correlation to determine which value is greater, wherein the correlation module uses the greater value for the virtual x-coordinate correlation and the virtual y-coordinate correlation in correlating the position of the virtual pixel in the virtual image with the physical position on the physical specimen; and
   an output module configured to output the position of the image positioning coordinate.

2. The apparatus of claim 1, further comprising a position input unit configured to send the position input to the input receiving module in response to a physical movement of the position input unit.

3. The apparatus of claim 2, wherein the position input unit is simultaneously and independently movable along an x-axis and a y-axis and wherein physical movement of the position input unit substantially replicates movement of a physical slide when viewed under a microscope.

4. The apparatus of claim 3, wherein movement of the position input unit moves the image positioning coordinate within a boundary corresponding to a dimension of the physical slide without re-centering the position input unit, and wherein movement of the image positioning coordinate moves a digital image such that every portion of a digital image is viewable with a continuous movement at any magnification.

5. The apparatus of claim 2, wherein the image positioning coordinate is used to determine a portion of a digital image to display.

6. The apparatus of claim 5, wherein the position input unit sends a second position input to the input receiving module in response to a physical movement of the position input unit, wherein the calculation module is configured to correlate the physical movement of the position input unit to a second position of the image positioning coordinate, wherein the output module outputs the second position of the image positioning coordinate and wherein the second position of the image positioning coordinate is referenced to move the portion of the digital image to be displayed, wherein the movement of the portion of the digital image displayed substantially replicates movement of a physical slide on a microscope.

7. The apparatus of claim 2, wherein the position input unit is configured to send the position input to the input receiving module as a tally of position input unit offsets from an original position of the position input unit.

8. The apparatus of claim 2, further comprising a bridging module coupled to the position input unit, wherein the input receiving module, the calculation module, and the output module reside within the bridging module such that output of the position of the image positioning coordinate is separated from traditional pointer input navigation of a computer.

9. The apparatus of claim 2, wherein the position input unit comprises at least two position sensors configured to sense a rotational position of the position input unit.

10. The apparatus of claim 1, further comprising a virtual input module configured to simulate a grid of virtual computer displays to extend a physical boundary of a physical computer display to a virtual boundary, the virtual boundary comprising the boundary of the grid of virtual computer displays, wherein a digital image of a physical specimen is mapped to an array of virtual pixel positions on the grid of virtual computer displays and wherein each virtual pixel position is correlated to a physical unit of measurement on the physical specimen.

11. The apparatus of claim 10, wherein the position input comprises a virtual x-coordinate and a virtual y-coordinate identifying a position in the array of virtual pixel positions, the virtual x-coordinate comprising a display x-coordinate plus a x display offset multiplied by a display resolution width, the virtual y-coordinate comprising a display y-coordinate plus a y display offset multiplied by a display resolution height.

12. The apparatus of claim 10, further comprising a display unit, wherein a resolution of the simulated grid of virtual computer displays is greater than a resolution of the display unit.

13. The apparatus of claim 1, wherein the virtual x-coordinate of the virtual pixel position corresponds to about 0.01 mm or less on the physical specimen and wherein virtual y-coordinate of the virtual pixel position corresponds to about 0.01 mm or less on the on the physical specimen.

14. The apparatus of claim 1, wherein the output module outputs the position of the image positioning coordinate as a physical position on a physical slide.

15. A system to simulate physical movement of a digital image, the system comprising:
a position input unit configured to send a position input identifying a physical unit of measure to an input receiving module in response to a physical movement of the position input unit;
an input receiving module configured to receive the position input;
a calculation module configured to correlate the position input to a position of an image positioning coordinate,
wherein the calculation module correlates a virtual x-coordinate of a virtual pixel position in a digital image of a physical specimen with a physical x-coordinate on the physical specimen by dividing a width of the physical specimen by a total number of virtual pixel positions in an x-axis to obtain an x-axis correlation;
wherein the calculation module correlates a virtual y-coordinate of a virtual pixel position in the digital image of the physical specimen with a physical y-coordinate on the physical specimen by dividing a height of the physical specimen by a total number of virtual pixel positions in a y-axis to obtain a y-axis correlation;
a comparison module configured to compare a value for the virtual x-coordinate correlation with a value for the virtual y-coordinate correlation to determine which value is greater, wherein the correlation module uses the greater value for the virtual x-coordinate correlation and the virtual y-coordinate correlation in correlating the position of the virtual pixel in the virtual image with the physical position on the physical specimen; and
an output module configured to output the position of the image positioning coordinate.

16. The system of claim 15, wherein the position input unit is simultaneously and independently movable along an x-axis and a y-axis and wherein physical movement of the position input unit substantially replicates movement of a physical slide when viewed under a microscope.

17. The system of claim 15, wherein the position input unit is configured to send the position input to the input receiving module as a tally of position input unit offsets from an original position of the position input unit.

18. The system of claim 15, wherein the position input unit comprises a virtual input module configured to simulate a grid of virtual computer displays to extend a physical boundary of a physical computer display to a virtual boundary, the virtual boundary comprising the boundary of the grid of virtual computer displays, wherein a digital image of a physical specimen is mapped to an array of virtual pixel positions on the grid of virtual computer displays and wherein each virtual pixel position is correlated to a physical unit of measurement on the physical specimen.

19. At least one computer storage device storing computer-executable instructions for simulating physical movement of a digital image of a physical specimen, the operations of the computer-executable instructions comprising instructions that, when executed by a computing device, cause the computing device to perform actions comprising:
receiving a position input;
correlating position input to a position of an image positioning coordinate,
wherein a virtual x-coordinate of a virtual pixel position in the digital image is correlated with a physical x-coordinate on the physical specimen by dividing a width of a physical specimen by a total number of virtual pixel positions in an x-axis to obtain an x-axis correlation; and
wherein a virtual y-coordinate of a virtual pixel position in the digital image is correlated with a physical y-coordinate on the physical specimen by dividing a height of the physical specimen by a total number of virtual pixel positions in a y-axis to obtain a y-axis correlation; and
comparing a value for the virtual x-coordinate correlation with a value for the virtual y-coordinate correlation to determine which value is greater, wherein the correlation module uses the greater value for the virtual x-coordinate correlation and the virtual y-coordinate correlation in correlating the position of the virtual pixel in the virtual image with the physical position on the physical specimen; and outputting the position of the image positioning coordinate.

20. The computer storage device of claim 19, wherein the actions further comprise sending the position input in response to a physical movement of a position input unit.

21. The computer storage device of claim 19, wherein the actions further comprise moving the image positioning coordinate within a boundary corresponding to a dimension of a physical slide without re-centering the position input unit.

22. The computer storage device of claim 19, wherein the actions further comprise simulating a grid of virtual computer displays to extend a physical boundary of a physical computer display to a virtual boundary, the virtual boundary comprising the boundary of the grid of virtual computer displays, wherein a digital image of a physical specimen is mapped to an array of virtual pixel positions on the grid of virtual computer displays and wherein each virtual pixel position is correlated to a physical unit of measurement on the physical specimen.

* * * * *